United States Patent
Higuchi et al.

(10) Patent No.: US 11,282,378 B2
(45) Date of Patent: Mar. 22, 2022

(54) VEHICULAR KNOWLEDGE DISTRIBUTION SYSTEM

(71) Applicant: TOYOTA JIDOSHA KABUSHIKI KAISHA, Toyota (JP)

(72) Inventors: Takamasa Higuchi, Mountain View, CA (US); Seyhan Ucar, Mountain View, CA (US); Onur Altintas, Mountain View, CA (US)

(*) Notice: Subject to any disclaimer, the term of this patent is extended or adjusted under 35 U.S.C. 154(b) by 413 days.

(21) Appl. No.: 16/365,092

(22) Filed: Mar. 26, 2019

(65) Prior Publication Data

US 2020/0312128 A1    Oct. 1, 2020

(51) Int. Cl.
*G08G 1/01*    (2006.01)
*H04W 4/40*    (2018.01)

(52) U.S. Cl.
CPC ......... *G08G 1/0141* (2013.01); *G08G 1/0112* (2013.01); *H04W 4/40* (2018.02)

(58) Field of Classification Search
CPC .......................... G08G 1/0141; G08G 1/0112
See application file for complete search history.

(56) References Cited

U.S. PATENT DOCUMENTS

| | | | |
|---|---|---|---|
| 2019/0079659 A1* | 3/2019 | Adenwala | H04W 4/026 |
| 2019/0132709 A1* | 5/2019 | Graefe | H04W 4/38 |

* cited by examiner

*Primary Examiner* — Thomas G Black
*Assistant Examiner* — Tarek Elarabi
(74) *Attorney, Agent, or Firm* — Burbage Law, P.C.; Jon-Michael Burbage; Elizabeth Ruzich

(57) ABSTRACT

The disclosure includes embodiments for generating and distributing knowledge. In some embodiments, a method for a connected endpoint includes analyzing, on an information layer, sensor data to generate a set of information that describes one or more events that occur in a roadway environment. The method includes generating, on a knowledge layer, knowledge based on the set of information according to a standard to increase a use efficiency of one or more computational resources of the connected endpoint and to improve a capability of the connected endpoint to distribute the knowledge.

20 Claims, 10 Drawing Sheets

VEHICULAR KNOWLEDGE DISTRIBUTION SYSTEM

BACKGROUND

The specification relates to creation and distribution of knowledge among various connected endpoints.

Vehicles are expected to generate and consume an increasing amount of information. Some typical examples of the information include digital data describing one or more of following: (1) measurement information produced by onboard sensors of the vehicles; and (2) positions and dynamic states of other vehicles and road objects obtained from other vehicles via Vehicle-to-Everything (V2X) networks.

SUMMARY

As used herein, the term "vehicle" may refer to a connected vehicle. A connected vehicle is a vehicle that includes a communication unit that is operable to send and receive V2X communications via one or more V2X networks.

The embodiments are described herein by reference, directly or indirectly, to the following definitions for the terms data, information, and knowledge: data includes bits that describe a recorded experience (e.g., 25 miles per hour (mph), at time "t" and position "p", etc.); information includes bits that describe a group of one or more instances of data that are processed to be "meaningful" (e.g., information that provides answers to "who," "what," "where," and "when" (e.g., Vehicle A was moving at 25 mph at t and p); and knowledge includes bits that describe a fact, or at least a belief, extracted by analyzing patterns that are discernable in a sufficiently populated set of information. An example of a fact includes the following: Vehicle A cannot accelerate anymore to pass Vehicle B because the speed limit is reached. An example of a belief includes the following: human-driven vehicles tend to drive over the speed limit. Other facts and beliefs are possible.

An example of a set of information is now described: Remote Vehicle A is located at position p(A) at a first time t1; Remote Vehicle B is located at position p(B) at the first time t1; and Ego Vehicle C is located at position p(C) at the first time t1. In some embodiments, the information described in this paragraph is recorded by the onboard sensors of one or more vehicles and described by the sensor data of these vehicles. An example of knowledge extracted from the set of information described in this paragraph is now described: there is a risk of collision between Vehicle A and Vehicle B at position p(D) located X meters ahead of Ego Vehicle C at a second time t2.

Currently, vehicles include many different vehicle control systems. An example of a vehicle control system includes an Advanced Driver Assistance System (ADAS system) or an autonomous driving system. A vehicle may include multiple vehicle control systems. Each of these vehicle control systems is responsible for analyzing the information generated by the vehicle's onboard sensors to generate their own knowledge. This knowledge is used by the vehicle control system to provide its functionality.

The current situation described in the preceding paragraph is problematic for two example reasons: (1) multiple applications running on the onboard vehicle computer may execute redundant analysis in parallel to interpret a set of information and generate redundant instances of similar knowledge, thereby resulting in an inefficient use of the vehicle's computational resources; and (2) knowledge created by "application A" may not be compatible with "application B," i.e., a limited capability to distribute knowledge among other applications or vehicles. As a result, the created knowledge may not be beneficial to other vehicles or applications. Thus, applications sharing their knowledge with one another (e.g., intra-vehicle), or with other vehicles (e.g., via V2X), may not be a useful solution due to the incompatibility across different applications/platforms. In other words, the existing solutions are problematic because they limit the ability of vehicles to distribute knowledge among vehicle applications (e.g., intra-vehicle distribution of knowledge) or other vehicles (e.g., extra-vehicle distribution of knowledge among other vehicles via V2X).

An example benefit of some of the embodiments described herein is that they beneficially provide a system architecture for vehicle applications where the system architecture has a "knowledge layer" that generates knowledge, as defined above, according to a standard so that individual vehicle applications (e.g., vehicle control applications or other types of vehicle applications) do not need to generate their own knowledge in their own individual format that limits the distribution of this knowledge. In this way, some of the embodiments described herein provide a software solution that eliminates the inefficient use of computational resources and the limited capability of vehicles to distribute knowledge among other applications (e.g., intra-vehicle) or other vehicles (e.g., extra-vehicle via V2X).

There is no existing solution that provides a system architecture for vehicle applications where the system architecture has a "knowledge layer" that generates knowledge according to a standard so that individual applications do not need to generate their own knowledge in their own individual format that limits the distribution of this knowledge. There is also no existing solution that provides a software solution that eliminates the inefficient use of computational resources and the limited capability of vehicles to distribute knowledge among other applications (e.g., intra-vehicle) or other vehicles (e.g., extra-vehicle via V2X).

The embodiments are now described. The embodiments include: (1) software installed in a roadside edge server, a cloud server, a remote vehicle, or some other connected endpoint (i.e., a knowledge client); and (2) software installed in an onboard unit of a connected endpoint such as an ego vehicle (i.e., a knowledge manager).

In some embodiments, the knowledge client is itself an element of the knowledge manager. In this way, an ego vehicle and a remote vehicle may each include an instance of a knowledge manager and a knowledge client as depicted in FIG. 1B. In some embodiments, the knowledge client is not an element of the knowledge manager. For example, in some embodiments, a remote vehicle includes a knowledge client but not a knowledge manager and the knowledge manager is an element of an ego vehicle, and in this way the knowledge client and the knowledge manager of the remote vehicle and the ego vehicle, respectively, wireless communicate and cooperate with one another to provide the functionality described herein. As used herein, a remote vehicle and an ego vehicle are each a connected vehicle which is capable of transmitting and receiving wireless messages via a network such as the network 105 described herein.

The knowledge client and the knowledge manager are now described with reference to the remote vehicle and the ego vehicle for purposes of clarity. However, in general, neither the knowledge client nor the knowledge manager need be defined based on whether they are present in a remote vehicle or ego vehicle. Similarly, the remote vehicle and the ego vehicle need not be defined based on whether it includes a knowledge client or a knowledge manager. Accordingly, the definitions provided below in the following two paragraphs are not intended to be limiting in this way.

In some embodiments, a knowledge client includes software installed in an onboard unit of a remote vehicle which is operable, when executed by the onboard unit, to cause the onboard unit operate a communication unit of the remote vehicle to use wireless messages to cooperate with the knowledge manager to receive wireless messages that include, as their payload, digital data that describes knowledge. In some embodiments, the knowledge client is also operable, when executed by the onboard unit, to cause the onboard unit operate an onboard sensor set and a communication unit of the remote vehicle to record sensor measurements and transmit wireless messages to the ego vehicle that include, as their payload, sensor data that describes the sensor measurements recorded by the sensor set.

In some embodiments, a knowledge manager is software installed in an onboard unit of an ego vehicle that is operable, when executed by the onboard unit, to cause the onboard unit to execute one or more of the following steps: aggregate sensor data recorded by the ego vehicle's own onboard sensors and, optionally, the sensor data recorded by the sensor set of a remote vehicle that provides its own sensor data to the knowledge manager via wireless communications; analyze the sensor data to generate a set of information that describes answers to "who," "what," "where," and "when" questions about a roadway environment; and then analyze patterns within the set of information to extract knowledge that is supported by the information; and share the knowledge with the remote vehicles via V2X communicates that include, as their payload, digital data that describes the knowledge.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a connected endpoint, including: analyzing, on an information layer, sensor data to generate a set of information that describes one or more events that occur in a roadway environment; and generating, on a knowledge layer, knowledge based on the set of information according to a standard to increase a use efficiency of one or more computational resources of the connected endpoint and to improve a capability of the connected endpoint to distribute the knowledge. Other embodiments of this aspect include corresponding computer systems, apparatus, and computer programs recorded on one or more computer storage devices, each configured to perform the actions of the methods.

Implementations may include one or more of the following features. The method where the knowledge has a common format compatible with one or more of a first group of applications on the connected endpoint and a second group of applications on one or more other endpoints. The method further including: distributing the knowledge from the knowledge layer to the one or more of the first group of applications on the connected endpoint via an intra-endpoint communication and the second group of applications on the one or more other endpoints via a V2X communication so that the use efficiency of the one or more computational resources of the connected endpoint is increased and the capability of the connected endpoint to distribute the knowledge is improved. The method where distributing the knowledge from the knowledge layer to the second group of applications on the one or more other endpoints via the V2X communication includes: modifying an operation of a communication unit of the connected endpoint to transmit a V2X message that includes the knowledge to the one or more other endpoints. The method where generating, on the knowledge layer, the knowledge based on the set of information according to the standard includes: applying a set of knowledge inference rules to create the knowledge based on one or more of the set of information and existing knowledge that is already created; and associating the knowledge with a set of knowledge tags. The method where the knowledge is distributed to the one or more of the first group of applications on the connected endpoint and the second group of applications on the one or more other endpoints based on the set of knowledge tags so that the capability of the connected endpoint to distribute the knowledge is further improved. The method where the set of knowledge tags includes one or more of the following: a location tag; a time tag; a content tag; and a priority tag. The method further including storing the knowledge in a knowledge base based on the set of knowledge tags. The method where the one or more events describe one or more answers to one or more questions about the roadway environment. The method where the knowledge includes digital bits that describe a fact or a belief that is extracted from analyzing one or more patterns in the set of information. The method further including: aggregating the sensor data on the information layer based on a first set of sensor data generated by one or more sensors of the connected endpoint and a second set of sensor data received from one or more other connected endpoints via a V2X communication. Implementations of the described techniques may include hardware, a method or process, or computer software on a computer-accessible medium.

One general aspect includes a system including an onboard computer system of a connected endpoint including a non-transitory memory storing computer code which, when executed by the onboard computer system, causes the onboard computer system to: analyze, on an information layer, sensor data to generate a set of information that describes one or more events that occur in a roadway environment; and generate, on a knowledge layer, knowledge based on the set of information according to a standard to increase a use efficiency of one or more computational resources of the connected endpoint and to improve a capability of the connected endpoint to distribute the knowledge. Other embodiments of this aspect include corresponding computer systems, apparatus, and computer programs recorded on one or more computer storage devices, each configured to perform the actions of the methods.

Implementations may include one or more of the following features. The system where the knowledge has a common format compatible with one or more of a first group of applications on the connected endpoint and a second group of applications on one or more other endpoints. The system where the computer code, when executed by the onboard computer system, causes the onboard computer system to: distribute the knowledge from the knowledge layer to the one or more of the first group of applications on the connected endpoint via an intra-endpoint communication and the second group of applications on the one or more other endpoints via a V2X communication so that the use efficiency of the one or more computational resources of the connected endpoint is increased and the capability of the connected endpoint to distribute the knowledge is improved. The system where the computer code, when executed by the onboard computer system, causes the onboard computer system to distribute the knowledge from the knowledge layer to the second group of applications on the one or more other endpoints via the V2X communication at least by: modifying an operation of a communication unit of the connected endpoint to transmit a V2X message that includes the knowledge to the one or more other endpoints. The system where the computer code, when executed by the onboard computer system, causes the onboard computer system to generate, on the knowledge layer, the knowledge based on the set of information according to the standard at least by: applying a set of knowledge inference rules to create the knowledge based on one or more of the set of information and existing knowledge that is already created; and associating the knowledge with a set of knowledge tags. The system where the knowledge is distributed to the one or more of the first group of applications on the connected endpoint and the second group of applications on the one or more other endpoints based on the set of knowledge tags so that the capability of the connected endpoint to distribute the knowledge is further improved. The system where the set of knowledge tags includes one or more of the following: a location tag; a time tag; a content tag; and a priority tag. Implementations of the described techniques may include hardware, a method or process, or computer software on a computer-accessible medium.

One general aspect includes a computer program product including a non-transitory memory of an onboard computer system of a connected endpoint storing computer-executable code that, when executed by a processor, causes the processor to: analyze, on an information layer, sensor data to generate a set of information that describes one or more events that occur in a roadway environment; and generate, on a knowledge layer, knowledge based on the set of information according to a standard to increase a use efficiency of one or more computational resources of the connected endpoint and to improve a capability of the connected endpoint to distribute the knowledge. Other embodiments of this aspect include corresponding computer systems, apparatus, and computer programs recorded on one or more computer storage devices, each configured to perform the actions of the methods.

Implementations may include one or more of the following features. The computer program product where the knowledge has a common format compatible with one or more of a first group of applications on the connected endpoint and a second group of applications on one or more other endpoints. The computer program product where the computer-executable code, when executed by the processor, causes the processor further to: distribute the knowledge from the knowledge layer to the one or more of the first group of applications on the connected endpoint via an intra-endpoint communication and the second group of applications on the one or more other endpoints via a V2X communication so that the use efficiency of the one or more computational resources of the connected endpoint is increased and the capability of the connected endpoint to distribute the knowledge is improved. The computer program product where the computer-executable code, when executed by the processor, causes the processor to generate, on the knowledge layer, the knowledge based on the set of information according to the standard at least by: applying a set of knowledge inference rules to create the knowledge based on one or more of the set of information and existing knowledge that is already created; and associating the knowledge with a set of knowledge tags. The computer program product where the knowledge is distributed to the one or more of the first group of applications on the connected endpoint and the second group of applications on the one or more other endpoints based on the set of knowledge tags so that the capability of the connected endpoint to distribute the knowledge is further improved. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

As used herein, data (e.g., sensor data) may be referred to as bits that describe a recorded experience (e.g., 25 miles per hour (mph), a time t, or a position p, etc.). Information may include bits that describe a group of one or more instances of data that are processed to be "meaningful" (e.g., information that provides answers to "who," "what," "where" and "when" questions such as Vehicle A is moving at 25 mph at the time t and the position p). Knowledge may be referred to as bits that describe a fact, or at least a belief, extracted by analyzing patterns that are discernable in a sufficiently populated set of information.

Figure 1A:
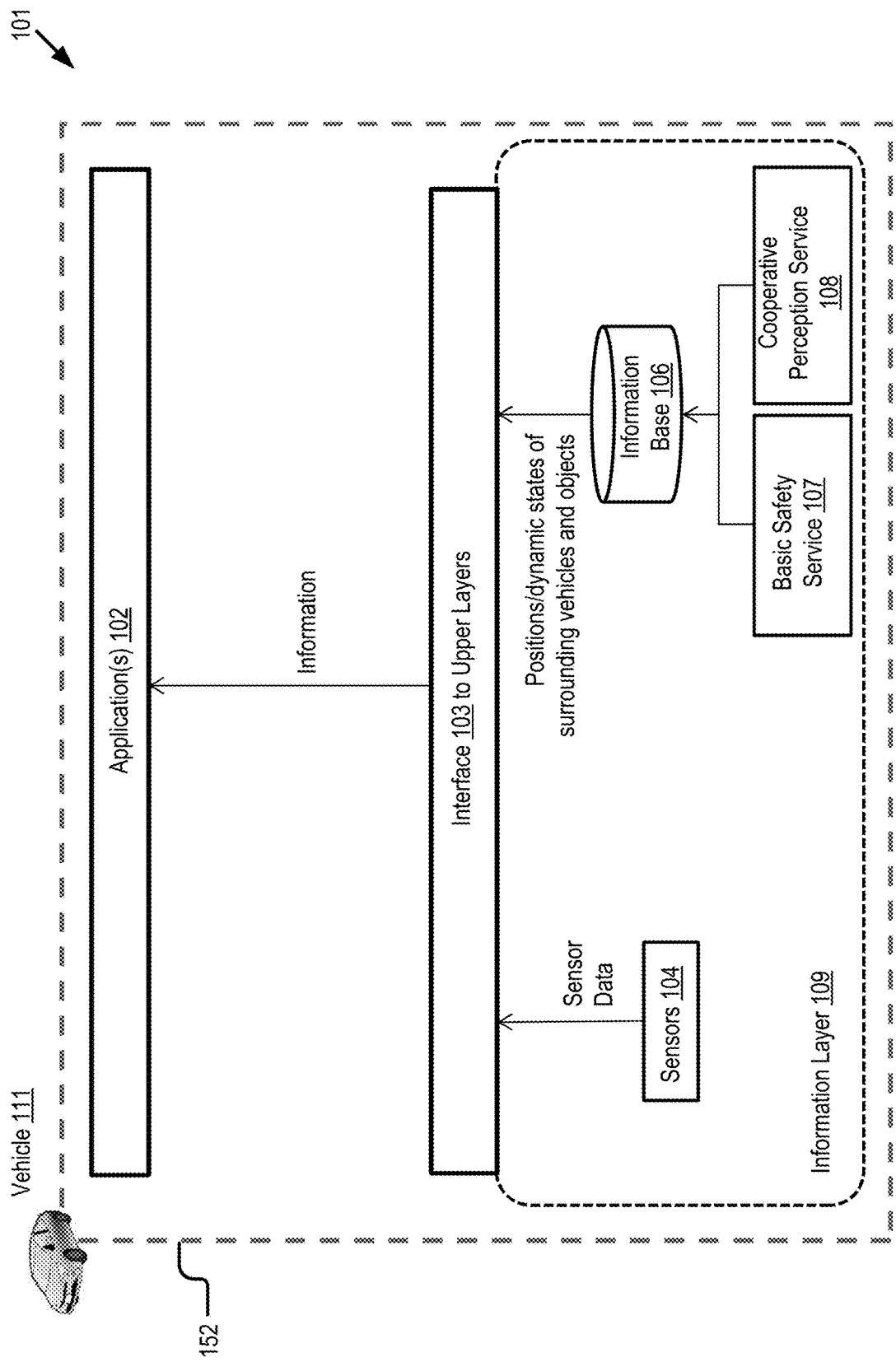
FIG. 1A is a block diagram illustrating an example architecture to generate knowledge.
Figure 1B:
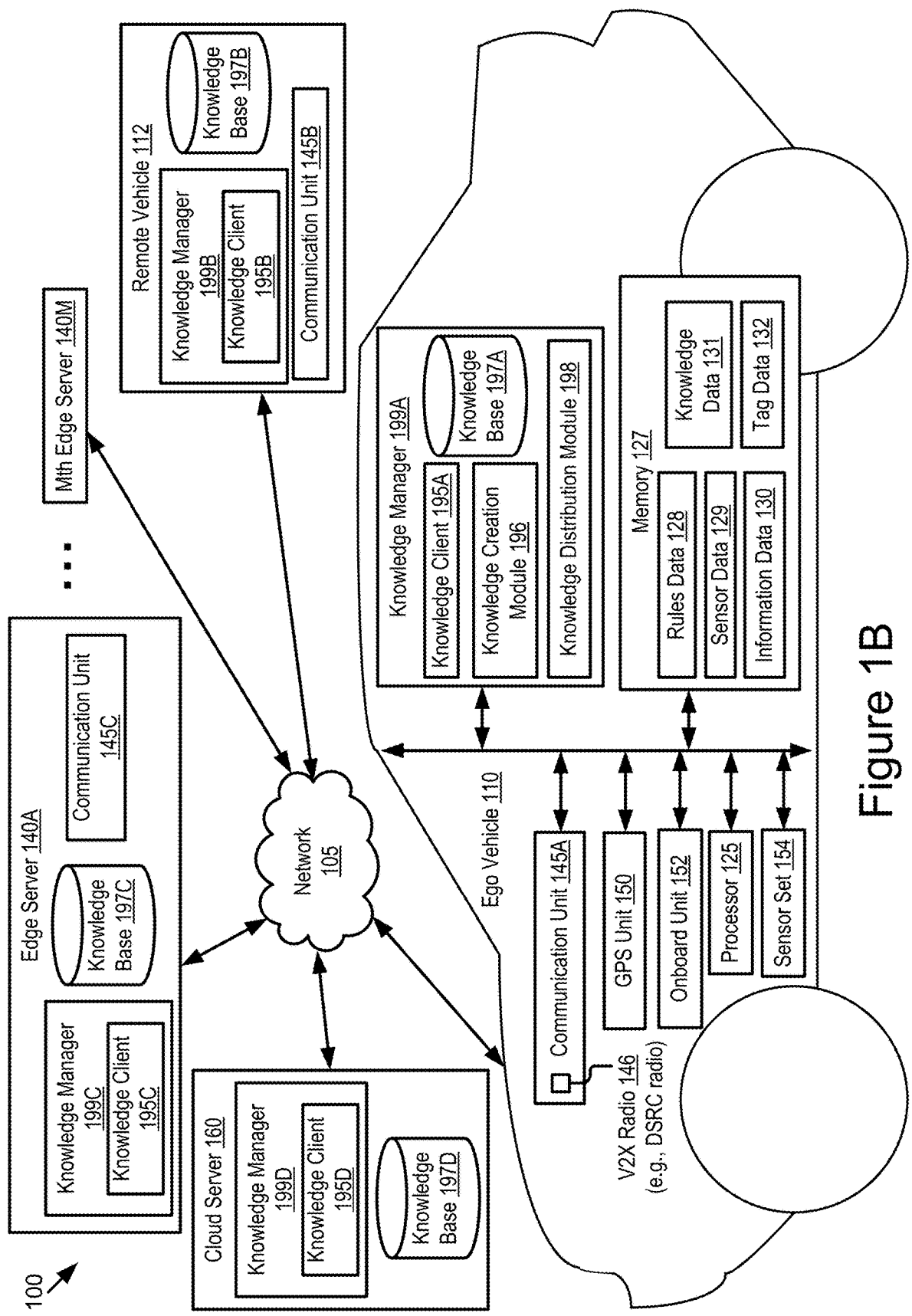
FIG. 1B is a block diagram illustrating an operating environment for a knowledge manager and a knowledge client according to some embodiments.
Figure 1C:
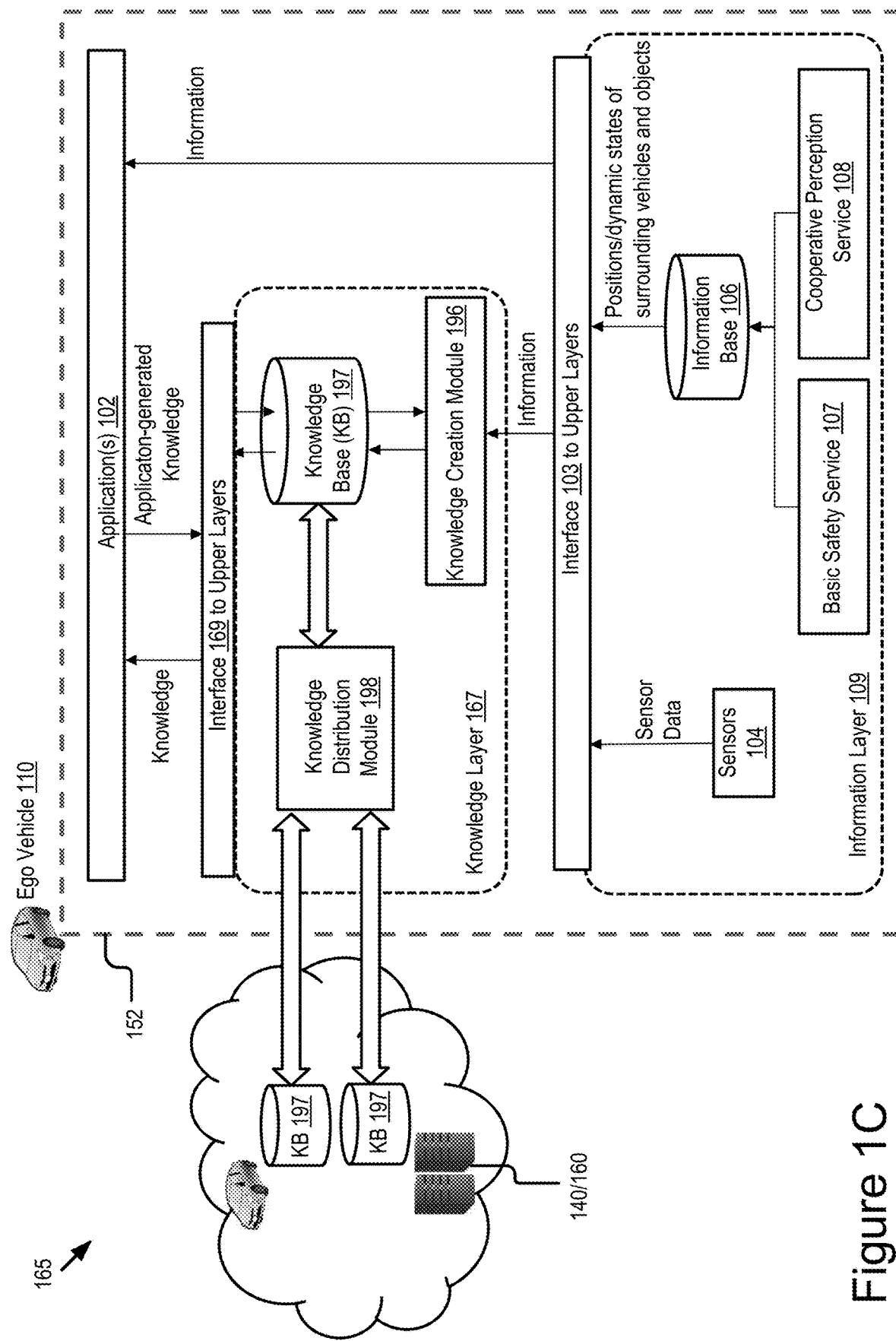
FIG. 1C is a block diagram illustrating an example architecture to generate knowledge according to some embodiments.
Figure 1D:
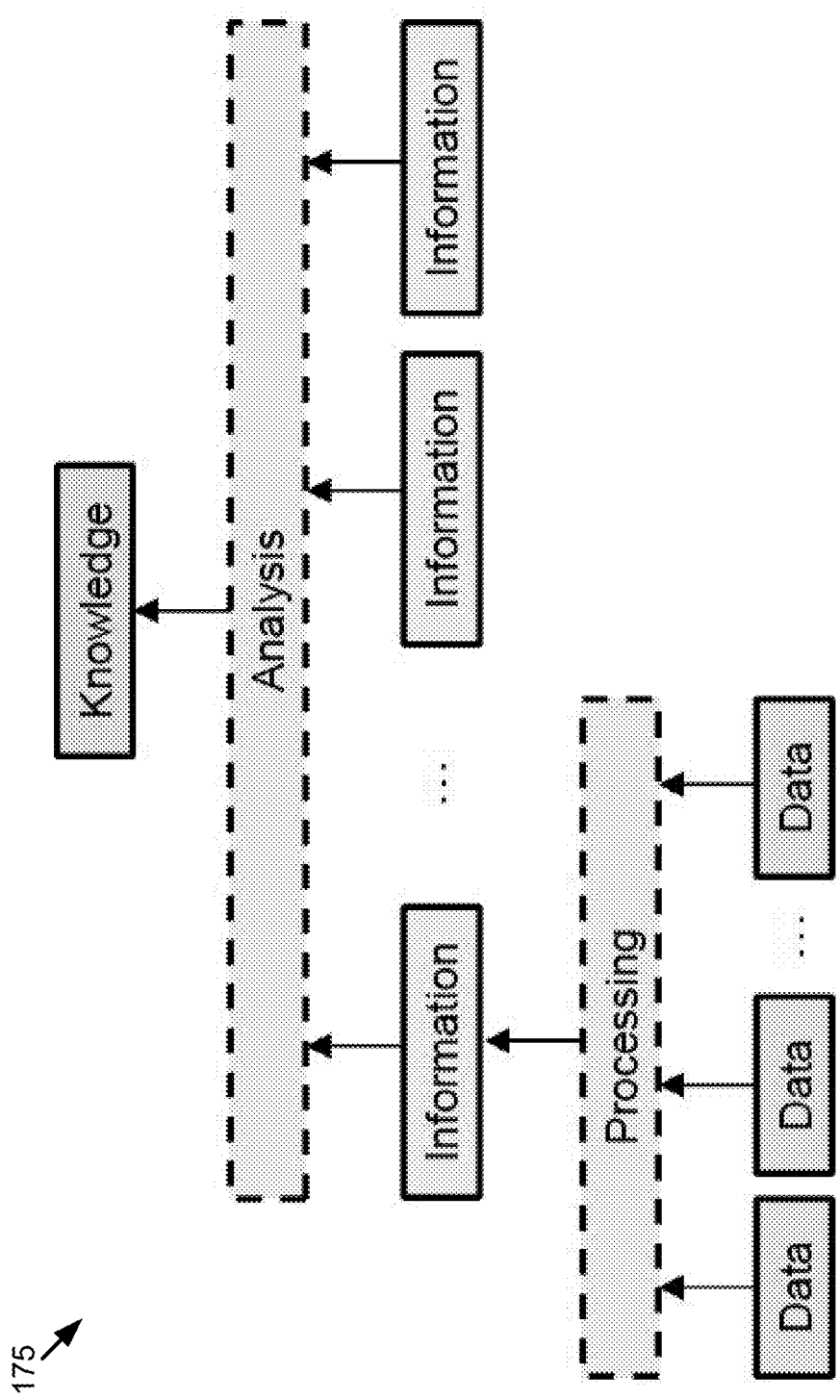
FIG. 1D is a graphic representation illustrating an example process to generate knowledge from data (e.g., sensor data) according to some embodiments.

Referring to FIG. 1D, an example process 175 to generate knowledge from data (e.g., sensor data) is illustrated according to some embodiments. The data recorded by one or more sensors can be aggregated and processed to generate a set of information. Then, the set of information can be analyzed to generate knowledge.

For example, assume that a set of information describes the following: an automated driving vehicle A is moving at 65 mph on a lane A of a road; a human-driven vehicle B is moving at 70 mph on a lane B of the road; a human-driven vehicle C is moving at 70 mph on a lane C of the road; and a speed limit for the road is 65 mph. Example knowledge extracted from the set of information includes one or more of the following: the vehicle A cannot accelerate anymore to pass the vehicle B because the speed limit is reached (e.g., knowledge as a fact); and human-driven vehicles tend to drive over speed (e.g., knowledge as a belief).

In another example, assume that a set of information describes the following: a vehicle A is located at a position p(A) at a time t; a vehicle B is located at a position p(B) at the time t; an ego vehicle C is located at a position p(C) at the time t; and the positions p(A), p(B) and p(C) are currently ahead of a position of the ego vehicle. Example knowledge extracted from the set of information includes the following: there is a risk of collision when a vehicle X meters ahead of the ego vehicle (due to a fact that the vehicles A, B and C are currently ahead of the ego vehicle).

Various mechanisms may be adopted to exchange information among vehicles and roadside infrastructure devices. Examples of these mechanisms include, but are not limited to, the following: (1) Society of Automotive Engineers (SAE)—Basic Safety Message (BSM), Signal Phase and Timing Message, etc.; and (2) European Telecommunications Standards Institute (ETSI)—Cooperative Awareness Message, Local Dynamic Map, etc. In many cases, automotive applications further analyze the information to produce knowledge, where the knowledge is, for example, higher-level semantics extracted from a set of instances of the information.

FIG. 1A illustrates an example architecture 101 to generate knowledge based on information. In a roadway environment, each vehicle periodically broadcasts positions and dynamic states of the vehicle itself and surrounding road objects that are perceived by its onboard sensors over V2X networks. For example, assume that the roadway environment includes at least a vehicle 111 and a surrounding vehicle near the vehicle 111. Through a basic safety service 107, the vehicle 111 may periodically receive a basic safety message including a position and a dynamic state of the surrounding vehicle by one-hop Vehicle-to-Vehicle (V2V) communication with the surrounding vehicle. In another example, through a cooperative perception service 108, the vehicle 111 may periodically receive positions, types, and dynamic states of surrounding road objects that are perceived by onboard sensors of the surrounding vehicle over one-hop V2V communication with the surrounding vehicle. This information obtained through a V2X communication (e.g., referred to as V2X information) is stored in a local information base 106 (e.g., ETSI local dynamic map) of the vehicle 111.

Sensors 104 of the vehicle 111 also record sensor data describing the roadway environment. The sensor data generated by the vehicle 111 itself and the V2X information (e.g., positions and dynamic states of surrounding vehicles and objects) are aggregated at an information layer 109 and transmitted to one or more applications 102 via an interface 103. The interface 103 may be an interface from the information layer 109 to an upper layer.

Each application 102 running on the onboard unit 152 produces knowledge based on the information from one or more of the onboard sensors 104 and the local information base 106. The knowledge is then used by the corresponding application 102 to offer its own services (e.g., driving assistance). However, in FIG. 1A the individual applications 102 are responsible for interpreting the raw information to produce knowledge that fulfills their own needs.

This generation of knowledge in FIG. 1A may lead to an inefficient use of computational resources of the vehicle 111. For example, multiple applications running on an onboard vehicle computer may execute redundant analysis in parallel to interpret a similar set of information and generate redundant instances of similar knowledge. In a further example, multiple safety applications may separately calculate a risk of collision (which is an instance of safety knowledge) based on positions and speeds of vehicles in the vicinity (which are instances of the information), which may lead to redundant analysis on the same set of information.

Besides, this generation of knowledge may also result in a limited capability to distribute knowledge among other applications or vehicles. For example, the knowledge created by an application A may not be compatible with an application B. As a result, the created knowledge may not be beneficial to other vehicles or applications. Thus, exhaustive dissemination of knowledge (e.g., periodic flooding over V2V networks) may not be an optimal solution. Applications sharing their knowledge with one another (e.g., intra-vehicle), or with other vehicles (e.g., via V2X), may not be a useful solution due to the incompatibility across different applications or platforms.

An example difference between the use case depicted in FIG. 1A and the embodiments described herein (with reference to FIGS. 1B-6B described below in more detail) includes the following: in accordance with the embodiments described herein, individual applications are not responsible for generating their own knowledge. In a vehicular knowledge distribution system and method provided by the embodiments described herein, a knowledge layer is constructed between an information layer and a layer of applications (e.g., see FIG. 1C). The knowledge layer is configured for creating knowledge that is commonly beneficial for multiple applications running on a same vehicle and on other vehicles. The knowledge is created by inference based on one or more of existing knowledge and information aggregated in the information layer. Each created knowledge is associated with a set of knowledge tags, which can be used to efficiently distribute the knowledge among various vehicles.

In some embodiments, the knowledge layer is also configured for distributing the knowledge. For example, based on the set of knowledge tags, vehicles intelligently disseminate the knowledge to one or more of other vehicles, remote cloud servers and edge servers over vehicular networks. In this way, vehicles that may be interested in the knowledge can obtain it in a timely manner while a communication overhead is suppressed (i.e., if a vehicle is not interested in a certain type of knowledge, then other vehicles may not transmit this type of knowledge to the vehicle). The knowledge layer may also be configured to provide other functionality, which is not limited thereto.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-V2V message, a LTE-Vehicle-to-Infrastructure (LTE-V2I) message, a LTE-V2N message, etc.); a 5G-V2X message; and a millimeter wave message, etc.

Example Overview

Referring to FIG. 1B, depicted is an operating environment 100 for a knowledge manager 199 and a knowledge client 195 according to some embodiments. The operating environment 100 may include one or more of the following elements: an ego vehicle 110; a remote vehicle 112; one or more edge servers 140; and a cloud server 160. These elements of the operating environment 100 may be communicatively coupled to a network 105.

Although one ego vehicle 110, one remote vehicle 112, two edge servers 140, one cloud server 160 and one network 105 are depicted in FIG. 1B, in practice the operating environment 100 may include any number of ego vehicles 110, any number of remote vehicles 112, any number of edge servers 140, any number of cloud servers 160 and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network, which is a wireless network for sending and receiving V2X messages among various endpoints (e.g., vehicles, roadside equipment, etc.) that each include a V2X radio.

In some embodiments, one or more of the ego vehicle 110 and the remote vehicle 112 may be DSRC-equipped vehicles. The network 105 may include one or more communication channels shared among the ego vehicle 110, the remote vehicle 112, the edge server 140, the cloud server 160 and one or more roadside units (RSUs). The one or more communication channels may include DSRC, LTE-V2X, 5G-V2X, full-duplex wireless communication or any other wireless communication protocol. For example, the network 105 may be used to transmit a DSRC message, DSRC probe or BSM including any of the data described herein.

In some embodiments, a DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The ego vehicle 110 may be any type of vehicle. For example, the ego vehicle 110 may include one of the following types of vehicles: a car; a truck; a sports utility vehicle; a bus; a semi-truck; a drone or any other roadway-based conveyance.

In some embodiments, the ego vehicle 110 may include an autonomous vehicle or a semi-autonomous vehicle. For example, the ego vehicle 110 may include an Advanced Driver-Assistance System (e.g., an ADAS system). The ADAS system may provide some or all of the functionality that provides autonomous functionality.

In some embodiments, the ego vehicle 110 is a DSRC-enabled vehicle which includes an instance of the knowledge manager as well as a DSRC radio and DSRC-compliant GPS unit. The ego vehicle 110 may also include other V2X radios besides a DSRC radio. DSRC is not a requirement of embodiments described herein, and any form of V2X communications is also feasible.

The ego vehicle 110 may include one or more of the following elements: a processor 125; a memory 127; a communication unit 145A; a GPS unit 150; an onboard unit 152; a sensor set 154; a knowledge client 195A; and a knowledge manager 199A. These elements of the ego vehicle 110 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the knowledge manager 199A. The onboard vehicle computer system may be operable to access and execute the data stored on the memory 127 to provide the functionality described herein for the knowledge manager 199A or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 110 may include one or more memories 127.

The memory 127 of the ego vehicle 110 may store one or more of the following elements: rules data 128; sensor data 129; information data 130; knowledge data 131; and tag data 132.

The rules data 128 may include digital data that describes one or more knowledge inference rules. For example, the rules data 128 describes one or more knowledge inference rules that are used by a knowledge creation module 196 to analyze the information data 130 and to determine the knowledge data 131 based on information described by the information data 130.

A knowledge inference rule may be a rule that can be used to create knowledge. In some embodiments, a knowledge inference rule is described in a formal language such as propositional logic. For example, a knowledge inference rule describes that knowledge of a "danger situation" can be inferred from first information of "tires are slipped on a road" and second information of "a vehicle is driven with a high speed" (e.g., TIRES_SLIPPED_ON_ROAD∧DRIVE_HIGH_SPEED⇒DANGER). In another example, knowledge of a "high traffic" situation or "holidays" can be inferred based on information of "the time is 6 PM" (e.g., TIME_IS_6PM⇒(HIGH_TRAFFIC∨HOLIDAYS)). In some embodiments, a knowledge inference rule can also be represented in other forms such as first-order logic, fuzzy logic, Markov Logic Networks, etc.

The sensor data 129 can be digital data recorded by one or more sensors of the ego vehicle 110. For example, the sensor data 129 describes one or more sensor measurements recorded by the sensor set 154 of the ego vehicle 110.

The information data 130 can be digital data that describes a set of information. The set of information may describe one or more events that occur in a roadway environment. For example, the set of information describes answers to "who," "what," "where," and "when" questions about a roadway environment.

The knowledge data 131 can be digital data that describes knowledge created based on the set of information.

The tag data 132 can be digital data that describes one or more knowledge tags associated with the knowledge. For example, when a new instance of knowledge is created, it is associated with a set of knowledge tags, which includes one or more of the following: a location tag; a time tag; a content tag; a priority tag; and any other appropriate tags. A location tag describes one or more geographical regions that are relevant to the knowledge (e.g., a geographical area or a travel route that may be affected by road congestion due to a traffic accident). A time tag describes a period of time for which the knowledge is valid. A content tag provides a brief description of the content of the knowledge. A priority tag describes importance of the knowledge (e.g., an importance level of the knowledge).

The communication unit 145A transmits and receives data to and from the network 105 or to another communication channel. In some embodiments, the communication unit 145A may include a DSRC transceiver, a DSRC receiver and other hardware or software necessary to make the ego vehicle 110 a DSRC-enabled device. For example, the communication unit 145A includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The communication unit 145A includes a V2X radio 146. The V2X radio 146 is an electronic device that includes a V2X transmitter and a V2X receiver and is operable to send and receive wireless messages via any V2X protocol. For example, the V2X radio 146 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

In some embodiments, the GPS unit 150 is a conventional GPS unit of the ego vehicle 110. For example, the GPS unit 150 may include hardware that wirelessly communicates with a GPS satellite to retrieve data that describes a geographic location of the ego vehicle 110. For example, the GPS unit 150 retrieves GPS data describing the geographic location of the ego vehicle 110 from one or more GPS satellites. In some embodiments, the GPS unit 150 is a DSRC-compliant GPS unit of the ego vehicle 110 that is operable to provide GPS data describing the geographic location of the ego vehicle 110 with lane-level accuracy.

The onboard unit 152 can include one or more processors and one or more memories. For example, the onboard unit 152 includes an electronic control unit (ECU). The ECU is an embedded system in automotive electronics that controls one or more of electrical systems or subsystems in the ego vehicle 110. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the knowledge manager 199A of the ego vehicle 110 is installed in the onboard unit 152.

The sensor set 154 includes one or more sensors that are operable to measure a roadway environment outside of the ego vehicle 110. For example, the sensor set 154 may include one or more sensors that record one or more physical characteristics of the roadway environment that is proximate to the ego vehicle 110. The memory 127 may store sensor data that describes the one or more physical characteristics recorded by the sensor set 154. The roadway environment outside of the ego vehicle 110 may include the remote vehicle 112 and any other objects, and so, one or more of the sensors of the sensor set 154 may record sensor data that describes information about the remote vehicle 112 and any other objects.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the ego vehicle 110 and the remote vehicle 112 may have a similar structure, and the description provided herein for the ego vehicle 110 may also be applicable to the remote vehicle 112. For example, the remote vehicle 112 includes, among others, a knowledge manager 199B (which includes a knowledge client 195B), a knowledge base 197B and a communication unit 145B.

For example, the remote vehicle 112 is a vehicle that includes elements similar to the ego vehicle 110. The operating environment 100 includes N remote vehicles (e.g., N is a positive integer greater than or equal to 1). In some embodiments, remote vehicles 112 include a knowledge manager and keep the knowledge manager active, because distribution of knowledge data and knowledge bases 197 relies on the functionality of all the knowledge distribution modules of all the knowledge nodes that are present along one or more network paths through which knowledge data and knowledge bases 197 are delivered (see, e.g., FIGS. 6A-6B).

The edge server 140 includes a processor-based computing device which is installed in a roadside unit ("RSU") or some other processor-based infrastructure component of a roadway. In the operating environment 100 illustrated in FIG. 1B, the roadway includes M edge servers 140A . . . 140M, where M is any positive integer greater than or equal to one. The edge server 140A includes a knowledge manager 199C (which includes a knowledge client 195C), a knowledge base 197C and a communication unit 145C. The edge server 140A may also include a memory that stores one or more of the sensor data 129 and the information data 130. The edge server 140M may have a structure similar to that of the edge server 140A, and similar description is not repeated here.

In some embodiments, edge servers 140 are not available. For example, roadside units may not be available in rural environments to serve as edge servers. Accordingly, the cloud server 160 can host an instance of the knowledge manager (e.g., a knowledge manager 199D) so that this cloud-based knowledge manager can serve rural vehicles. Accordingly, embodiments described herein can be applied in urban environments as well as rural environments. The cloud server 160 may also include a knowledge client 195D, a knowledge base 197D and a communication unit.

The knowledge managers 199A, 199B, 199C and 199D may provide similar functionality and may be referred to herein as "knowledge manager 199" individually or collectively. The knowledge clients 195A, 195B, 195C and 195D may provide similar functionality and may be referred to herein as "knowledge client 195" individually or collectively. The knowledge base 197A, 197B, 197C and 197D may provide similar functionality and may be referred to herein as "knowledge base 197" individually or collectively. The communication units 145A, 145B and 145C may provide similar functionality and may be referred to herein as "communication unit 145" individually or collectively.

In some embodiments, the knowledge client 195 includes code and routines that are operable, when executed by a processor of the edge server 140, the cloud server 160 or the remote vehicle 112, to cause the processor to execute operations that use wireless messages to cooperate with the knowledge manager 199 of the ego vehicle 110 to: provide one or more of (1) sensor data and (2) information data to the ego vehicle 110; and request one or more of (1) knowledge data and (2) the knowledge base 197 from the ego vehicle 110.

In some embodiments, the knowledge client 195 may be implemented using hardware including a field-programmable gate array ("FPGA") or an application-specific integrated circuit ("ASIC"). In some other embodiments, the knowledge client 195 may be implemented using a combination of hardware and software. The knowledge client 195 may be stored in a combination of the devices (e.g., servers or other devices), or in one of the devices.

In some embodiments, any combination of cloud servers 160, edge servers 140 and connected vehicles (e.g., the ego vehicle 110 and the remote vehicle 112) may include instances of the knowledge client 195 so that the functionality of the knowledge client 195 is implemented in a distributed fashion among two or more endpoints connected to the network 105.

In some embodiments, the knowledge manager 199 includes software that is operable, when executed by the processor 125, to cause the processor 125 to execute one or more steps of methods 300, 400, 500 and 600 described below with reference to FIGS. 3-6B and one or more operations described below with reference to FIGS. 1C-1D.

In some embodiments, the knowledge manager 199 may be implemented using hardware including a field-programmable gate array ("FPGA") or an application-specific integrated circuit ("ASIC"). In some other embodiments, the knowledge manager 199 may be implemented using a combination of hardware and software. The knowledge manager 199 may be stored in a combination of the devices (e.g., servers or other devices), or in one of the devices.

In some embodiments, the knowledge manager 199 may be installed in the onboard unit 152 of the ego vehicle 110. The knowledge manager 199 includes code and routines that are operable, when executed by the processor 125 of the ego vehicle 110 or any other connected endpoint, to cause the processor 125 to execute one or more of the following operations: aggregating sensor data from the ego vehicle's onboard sensors and, optionally, remote vehicles 112 that provide their own sensor data to the knowledge manager 199 via wireless communications; analyzing the sensor data to generate a set of information (e.g., to generate information data) that describes answers to "who," "what," "where," and "when" questions about a roadway environment; analyzing patterns within the set of information to extract knowledge that is supported by the set of information (e.g., to generate knowledge data); determining appropriate tags for each instance of knowledge data; assigning (or associating) one or more instances of tag data to each instance of knowledge data that describes the tag for that particular instance of knowledge data; building one or more knowledge bases 197 based on the knowledge data and the tag data, which are aggregations of related knowledge data; and sharing one or more of the knowledge data and the knowledge bases 197 with the remote vehicles 112.

In some embodiments, besides the ego vehicle 110, the other connected endpoints depicted in FIG. 1B may also include their own instance of the knowledge manager 199 that is not "active" when the knowledge manager 199 of the ego vehicle 110 is active. In some embodiments, the knowledge client 195 is an element of the knowledge manager 199 that is active when some other endpoint has an active knowledge manager 199. Endpoints may negotiate whose knowledge manager 199 may be active for a period of time, or they may simply announce it to each other, and it is understood that they may hold the position as "manager" for the other vehicles for a predetermined period of time or until one or more other predetermined conditions are met. Other embodiments are also possible.

In some embodiments, the knowledge manager 199 includes one or more of the following: the knowledge client 195; a knowledge creation module 196; a knowledge distribution module 198; and the knowledge base 197.

In some embodiments, the knowledge base 197 includes digital data, or a digital data structure, that stores bits of data that describe: knowledge produced by the knowledge creation module 196; knowledge data received from the knowledge distribution module 198; and knowledge produced by applications of the ego vehicle 110.

In some embodiments, the knowledge creation module 196 includes software included in the knowledge manager 199 (not the knowledge client 195) that analyzes one or more of information data and sensor data and generates knowledge data.

In some embodiments, the knowledge distribution module 198 includes software included in the knowledge manager 199 (not the knowledge client 195) that distributes the knowledge base 197 to endpoints such as remote vehicles 112, edge servers 140 and cloud servers 160 that each include an instance of the knowledge client 195.

The knowledge manager 199 is described below in more detail with reference to FIGS. 1C and 2-6B.

Referring to FIG. 1C, an example architecture 165 to generate knowledge is illustrated according to some embodiments. Different from FIG. 1A described above, a knowledge layer 167 is included between the information layer 109 and a layer of applications 102. The sensor data generated by the ego vehicle 110 itself and the V2X information (e.g., positions and dynamic states of surrounding vehicles and objects) received via V2X communications are aggregated at the information layer 109 as a set of information and transmitted to the knowledge layer 167 via the interface 103.

The knowledge creation module 196 is configured to create knowledge by inference based on one or more of: (1) the set of information; and (2) existing knowledge that is needed for inference. The existing knowledge can be retrieved from the knowledge base (KB) 197 of the ego vehicle 110. The created knowledge can be stored in the knowledge base 197 of the ego vehicle 110. For example, the knowledge creation module 196 generates a set of knowledge tags for the created knowledge and associates the created knowledge with the set of knowledge tags. The knowledge creation module 196 stores the created knowledge according to the set of knowledge tags.

In some embodiments, knowledge data that describes knowledge stored in the knowledge base 197 can be transmitted to multiple applications 102 of the ego vehicle 110 via an interface 169 so that the knowledge data is shared among the multiple applications 102. In this way, the individual applications 102 do not need to interpret the information to produce knowledge by their own. The knowledge from the knowledge layer 167 is then used by the corresponding applications 102 to offer their own services (e.g., driving assistance). Here, the interface 169 may be an interface between the knowledge layer 167 and the layer of applications 102. For example, the knowledge data can be transmitted to the multiple applications 102 based on knowledge tags associated with the knowledge data so that each application 102 only receives knowledge associated with one or more knowledge tags that it is interested in.

In some embodiments, knowledge generated by the applications 102 (e.g., application-generated knowledge) can also be transmitted to the knowledge layer 167 via the interface 169 and stored in the knowledge base 197.

In some embodiments, the knowledge data in the knowledge base 197 is shared with one or more of (1) knowledge bases 197 of other vehicles, (2) edge servers 140 and (3) cloud servers 160 by the knowledge distribution module 198. For example, the knowledge data is efficiently shared with one or more of (1) the knowledge bases 197 of other vehicles, (2) the edge servers 140 and (3) the cloud servers 160 based on one or more knowledge tags associated with the knowledge data so that knowledge centric networking is achieved.

In FIG. 1C, knowledge is produced and maintained in the knowledge layer 167 and shared among multiple applications 102 of the ego vehicle 110 as well as knowledge bases 197 of other vehicles, cloud servers 160 and edge servers 140, etc. For example, knowledge that is commonly beneficial for multiple applications 102 may be produced and maintained in the knowledge layer, while the applications 102 may also produce application-specific knowledge by their own as needed.

In some embodiments, a combination of a plurality of knowledge clients 195 and a knowledge manager 199 that serves these particular knowledge clients 195 can be referred to as a "vehicular knowledge distribution system." Vehicles and servers constituting the vehicular knowledge distribution system can be referred to as "knowledge nodes." Accordingly, each endpoint of FIGS. 1B-1C (e.g., the ego vehicle 110, the remote vehicle 112, the edge server 140, the cloud server 160, etc.) can be a knowledge node. A knowledge node includes one or more of the following elements: (1) the knowledge creation module 196; (2) the knowledge distribution module 198; and (3) the knowledge base 197.

In some embodiments, the knowledge base 197 in each knowledge node stores digital data describe one or more of the following examples of knowledge: (1) knowledge produced by the knowledge creation module 196; (2) knowledge received from other knowledge nodes through the knowledge distribution module 198; and (3) knowledge produced by applications (e.g., application-generated knowledge). The knowledge base 197 may remove any instance of knowledge whose time to live expires (i.e., an associated time tag indicates that a designated time period expires). The application-generated knowledge may also be stored in the knowledge base 197 along with the knowledge produced by the knowledge creation module 196, so that the application-generated knowledge can be re-used for inference.

Example Computer System

Figure 2:
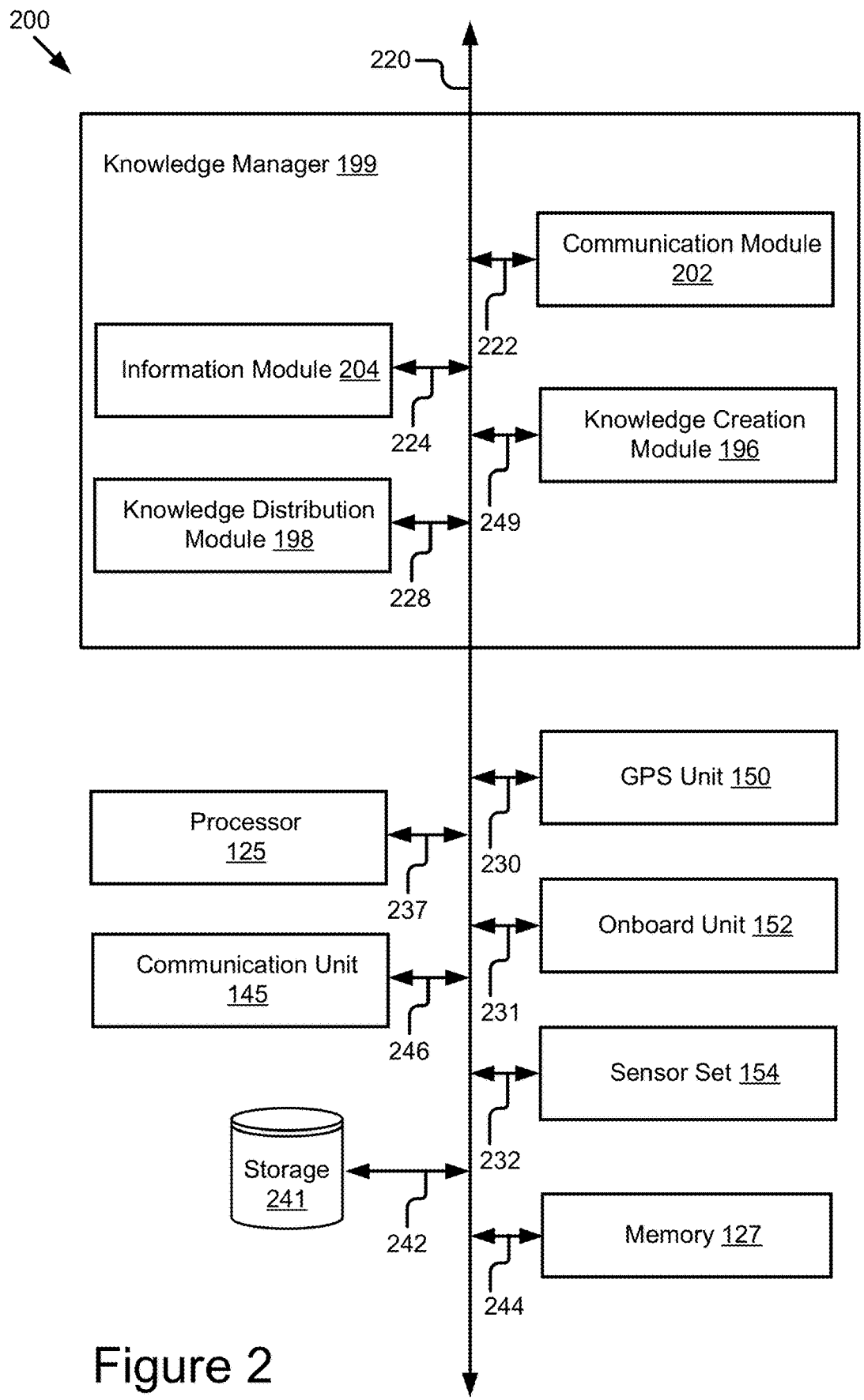
FIG. 2 is a block diagram illustrating an example computer system including a knowledge manager according to some embodiments.

Referring now to FIG. 2, depicted is a block diagram illustrating an example computer system 200 including the knowledge manager 199 according to some embodiments. In some embodiments, the computer system 200 may include a special-purpose computer system that is programmed to perform one or more steps of methods 300, 400, 500 and 600 described below with reference to FIGS. 3-6B.

In some embodiments, the computer system 200 may be an element of the ego vehicle 110. In some embodiments, the computer system 200 may be an onboard vehicle computer of the ego vehicle 110. In some embodiments, the computer system 200 may include an engine control unit, head unit or some other processor-based computing device of the ego vehicle 110.

The computer system 200 may include one or more of the following elements according to some examples: the knowledge manager 199; the processor 125; the communication unit 145; the sensor set 154; the GPS unit 150; the memory 127; the onboard unit 152; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The sensor set 154 is communicatively coupled to the bus 220 via a signal line 232. The GPS unit 150 is communicatively coupled to the bus 220 via a signal line 230. The storage 241 is communicatively coupled to the bus 220 via a signal line 242. The memory 127 is communicatively coupled to the bus 220 via a signal line 244. The onboard unit 152 is communicatively coupled to the bus 220 via a signal line 231.

The following elements of the computer system 200 are described above with reference to FIG. 1B, and so, those descriptions will not be repeated here: the processor 125; the communication unit 145; the sensor set 154; the GPS unit 150; the onboard unit 152; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the knowledge manager 199 includes: a communication module 202; an information module 204; the knowledge creation module 196; and the knowledge distribution module 198. In some embodiments, the knowledge manager 199 includes the knowledge client 195. These components of the knowledge manager 199 are communicatively coupled to each other via the bus 220. In some embodiments, components of the knowledge manager 199 can be stored in a single server or device. In some other embodiments, components of the knowledge manager 199 can be distributed and stored across multiple servers or devices. For example, some of the components of the knowledge manager 199 may be distributed across the remote vehicle 112, the edge server 140, the cloud server 160 and the ego vehicle 110.

The communication module 202 can be software including routines for handling communications between the knowledge manager 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, a V2X message. The communication module 202 may send or receive any of the data or messages described above with reference to FIG. 1B via the communication unit 145.

In some embodiments, the communication module 202 receives data from components of the knowledge manager 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the knowledge manager 199. For example, the communication module 202 may handle communications among the information module 204, the knowledge creation module 196 and the knowledge distribution module 198. Any of these modules may cause the communication module 202 to communicate with the other elements of the computer system 200 or the operating environment 100 (via the communication unit 145). For example, the information module 204 may use the communication module 202 to communicate with the sensor set 154 and cause the sensor set 154 to record sensor data.

The information module 204 can be software including routines for generating information. In some embodiments, the information module 204 can be stored in the memory 127 of the computer system 200 and can be accessible and executable by the processor 125. The information module 204 may be adapted for cooperation and communication with the processor 125 and other components of the computer system 200 via a signal line 224.

In some embodiments, the information module 204 may operate one or more sensors of the sensor set 154 to generate sensor data describing one or more measurements of the sensor set 154. The information module 204 may cause the sensor data to be stored in the memory 127. Specifically, the information module 204 may operate one or more sensors included in the sensor set 154 to record sensor data describing measurements of a physical environment proximate to the computer system 200. The remote vehicle 112 and other objects may be located in the physical environment proximate to the ego vehicle 110 that includes the computer system 200.

In some embodiments, the information module 204 is operable to receive: (1) a first set of sensor data generated by one or more sensors of the ego vehicle 110; and (2) a second set of sensor data from one or more other connected endpoints in the operating environment 100 via a V2X communication. The information module 204 aggregates sensor data on an information layer based on the first set of sensor data and the second set of sensor data so that the aggregated sensor data includes one or more of the first set of sensor data and the second set of sensor data.

In some embodiments, the information module 204 analyzes, on the information layer, the sensor data to generate a set of information that describes one or more events that occur in a roadway environment of the ego vehicle 110. The one or more events describe one or more answers to one or more questions about the roadway environment. For example, the information module 204 generates, from the aggregated sensor data, a set of information that describes answers to "who," "what," "when" and "where" questions about the roadway environment (e.g., the information module 204 generates a set of information describing that an accident occurs on a particular exit of a particular highway at 6 PM, Monday). The information module 204 forwards the set of information to the knowledge creation module 196.

The knowledge creation module 196 can be software including routines that, when executed by the processor 125, cause the processor 125 to create knowledge. In some embodiments, the knowledge creation module 196 can be a set of instructions stored in the memory 127 of the computer system 200 and can be accessible and executable by the processor 125. The knowledge creation module 196 may be adapted for cooperation and communication with the processor 125 and other components of the computer system 200 via a signal line 249.

In some embodiments, the knowledge creation module 196 generates, on a knowledge layer, knowledge based on the set of information according to a standard to increase a use efficiency of one or more computational resources of the ego vehicle 110 and to improve a capability of the ego vehicle 110 to distribute the knowledge. For example, this standard can be used to specify one or more of: (1) a format of the knowledge that is commonly acceptable by endpoints (or applications of the endpoints) in the roadway environment; (2) a way to produce the knowledge (e.g., knowledge can be produced based on one or more knowledge inference rules); and (3) a list of knowledge inference rules or an approach to generate new knowledge inference rules, etc.

Specifically, the knowledge has a common format compatible with one or more of (1) a first group of applications on the ego vehicle 110 and (2) a second group of applications on one or more other endpoints. Accordingly, the knowledge distribution module 198 described below distributes the knowledge from the knowledge layer to one or more of (1) the first group of applications on the ego vehicle 110 via an intra-endpoint communication (e.g., an intra-vehicle communication) and (2) the second group of applications on the one or more other endpoints via a V2X communication so that the use efficiency of the one or more computational resources of the ego vehicle 110 is increased and the capability of the ego vehicle 110 to distribute the knowledge is improved.

For example, because the knowledge can be used by each application in the first group of applications on the ego vehicle 110 so that the first group of applications do not need to generate their own knowledge from the set of information individually. In this way, computational resources of the ego vehicle 110 (e.g., CPU power, memory space and storage space of the ego vehicle 110) can be used efficiently without making redundant analysis on the set of information for the generation of the knowledge.

In another example, because the knowledge is also compatible with the second group of applications on one or more other endpoints so that the knowledge can also be beneficial to the one or more other endpoints and distributed to the one or more other endpoints. In this way, the second group of applications do not need to generate their own knowledge from the set of information individually. Computational resources of the one or more other endpoints can also be used efficiently without making redundant analysis on the set of information for the generation of the knowledge.

In some embodiments, the knowledge creation module 196 generates the knowledge based on the set of information according to a standard by performing one or more of the following operations: (1) retrieving or creating a set of knowledge inference rules; (2) retrieving the set of information from the information layer; (3) retrieving existing knowledge from the knowledge base 197; (4) creating the knowledge based on the set of knowledge inference rules by taking the set of information and the existing knowledge as input; and (5) creating a set of knowledge tags and associating the set of knowledge tags with the created knowledge.

Specifically, the knowledge creation module 196 may dynamically create new knowledge inference rules by finding patterns in the set of information and the existing knowledge. The creation of knowledge inference rules can be done by individual vehicles, or in a collaborative manner among multiple vehicles, remote cloud servers 160, and edge servers 140.

Next, the knowledge creation module 196 applies a set of knowledge inference rules to create the knowledge based on one or more of (i) the set of information and (ii) the existing knowledge. For example, the knowledge creation module 196 creates new knowledge by a set of knowledge inference rules, which take one or more of (i) the set of information at the information layer and (ii) the existing knowledge at the knowledge layer as input. In some embodiments, the knowledge includes digital bits that describe a fact or a belief that is extracted from analyzing one or more patterns in the set of information.

In a further example, assume that a knowledge inference rule describes that knowledge of a "danger situation" can be inferred from first information of "tires are slipped on a road" and second information of "a vehicle is driven with a high speed" (e.g., TIRES_SLIPPED_ON_ROAD∧ DRIVE_HIGH_SPEED⇒DANGER). The set of information indicates that: (1) a road surface of a highway is icy; and (2) a vehicle is driven at a speed of 60 mph. Based on the knowledge inference rule and the set of information, the knowledge creation module 196 can generate an instance of knowledge describing that the vehicle is driven in an unsafe state. In this case, this instance of knowledge can be transmitted to one or more vehicle control systems of the vehicle (e.g., a braking system, an ADAS system, an autonomous driving system, a user alerting system that provides driving alerts or instructions, etc.) so that the vehicle can be controlled to be driven at an appropriate speed by the one or more vehicle control systems.

Then, the knowledge creation module 196 creates a set of knowledge tags for the created knowledge and associates the created knowledge with the set of knowledge tags. For example, the set of knowledge tags includes one or more of the following: a location tag; a time tag; a content tag; and a priority tag, etc. The created knowledge is tagged with the set of knowledge tags so that the created knowledge can be easily classified and searched.

In some examples, the knowledge creation module 196 creates the knowledge tags by inference based on one or more knowledge inference rules. For example, based on a knowledge inference rule describing that "because an accident happened at a position p of a road R at 6 PM, the road R has a traffic jam" (e.g., ACCIDENT_ HAPPENED_AT_POSITION_P∧TIME_IS_6PM⇒ ROAD_R_IS_AFFECTED_BY_TRAFFIC_JAM), knowledge tags such as "very heavy traffic," "6 PM" and "position p of the road R," etc., can be generated and attached to the knowledge that is created based on the knowledge inference rule.

The knowledge creation module 196 assigns (or associates) one or more instances of tag data to each instance of knowledge data, where the tag data describes the knowledge tags for that particular instance of knowledge data. The knowledge creation module 196 then builds one or more knowledge bases 197 based on the knowledge data and the tag data. For example, the knowledge creation module 196 stores the created knowledge in the knowledge base 197 based on the set of knowledge tags associated with the created knowledge.

The knowledge distribution module 198 can be software including routines that, when executed by the processor 125, cause the processor 125 to distribute knowledge data. In some embodiments, the knowledge distribution module 198 can be a set of instructions stored in the memory 127 of the computer system 200 and can be accessible and executable by the processor 125. The knowledge distribution module 198 may be adapted for cooperation and communication with the processor 125 and other components of the computer system 200 via a signal line 228.

As described above, in some embodiments the knowledge distribution module 198 distributes the knowledge from the knowledge layer to the one or more of (1) the first group of applications on the ego vehicle 110 via an intra-vehicle communication and (2) the second group of applications on the one or more other endpoints via a V2X communication so that the use efficiency of the one or more computational resources of the ego vehicle 110 is increased and the capability of the ego vehicle 110 to distribute the knowledge is improved. For example, the knowledge distribution module 198 distributes the knowledge to the one or more of the first group of applications on the ego vehicle 110 and the second group of applications on the one or more other endpoints based on the set of knowledge tags so that the capability of the ego vehicle 110 to distribute the knowledge is further improved.

For example, based on the set of knowledge tags, the knowledge distribution module 198 distributes the knowledge to the other endpoints selectively (e.g., not all the knowledge is distributed to all the other endpoints, and for a particular endpoint, only knowledge that is beneficial for the endpoint is distributed to that endpoint). In this way, a saving of communication bandwidth can be achieved when compared to an approach where all the knowledge is flooded to all the other endpoints.

In some embodiments, the knowledge distribution module 198 distributes the knowledge from the knowledge layer to the second group of applications on the one or more other endpoints via the V2X communication at least by: modifying an operation of the communication unit 145 of the ego vehicle 110 to transmit a V2X message that includes the knowledge to the one or more other endpoints. For example, the knowledge distribution module 198 modifies one or more operation elements of the communication unit 145 to transmit the V2X message via the communication unit 145.

In some embodiments, the one or more operation elements of the communication unit 145 includes one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, when transmitting the V2X message, the knowledge distribution module 198 can modify one or more of the following operation elements of the communication unit 145: (1) increasing the number of active V2X channels so that more V2X channels can be used to communicate with other nearby vehicles simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with other nearby vehicles with a faster speed. In this way, communication efficiency of the ego vehicle 110 can be improved.

In some embodiments, the knowledge distribution module 198 of the ego vehicle 110 may distribute knowledge in its own knowledge base 197 to other knowledge nodes over vehicular networks so that vehicles can obtain relevant knowledge in a timely fashion. The knowledge distribution module 198 of the ego vehicle 110 may intelligently manage distribution of knowledge based on knowledge tags associated with each instance of the knowledge.

For example, the knowledge distribution module 198 of the ego vehicle 110 may perform one or more of the following operations: (1) requesting one or more other knowledge nodes for one or more instances of knowledge, which match a designated set of knowledge tags; (2) receiving a first request from a first knowledge node and forwarding the first request toward one or more second knowledge nodes, which are expected to have the knowledge requested by the first request (e.g., the one or more second knowledge nodes being knowledge nodes close to a geographical region indicated by a location tag); (3) receiving a second request from a third knowledge node, and responding to the second request if the ego vehicle 110 has the knowledge requested by the second request in its own knowledge base 197; and (4) while delivering an instance of knowledge that is requested by a fourth knowledge node along a delivery path toward the fourth knowledge node, caching the requested knowledge in its knowledge base 197.

The knowledge distribution module 198 is further described below with reference to FIGS. 6A-6B.

Example Processes

Figure 3:
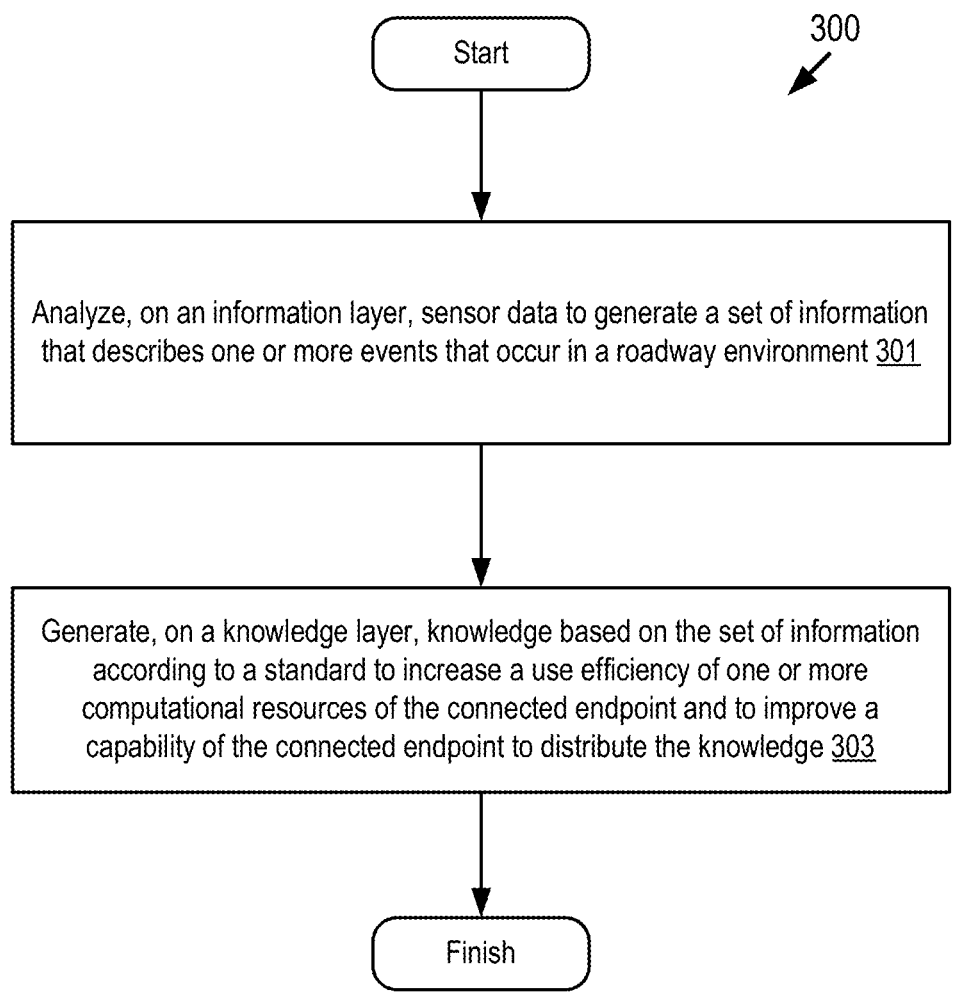
FIG. 3 depicts a method for generating knowledge according to some embodiments.

Referring now to FIG. 3, depicted is a flowchart of an example method 300 for generating knowledge according to some embodiments. The steps of the method 300 are executable in any order, and not necessarily the order depicted in FIG. 3. The method 300 can be executed on a connected endpoint such as the ego vehicle 110.

At step 301, the information module 204 analyzes, on an information layer, sensor data to generate a set of information that describes one or more events that occur in a roadway environment.

At step 303, the knowledge creation module 196 generates, on a knowledge layer, knowledge based on the set of information according to a standard to increase a use efficiency of one or more computational resources of the connected endpoint and to improve a capability of the connected endpoint to distribute the knowledge.

Figure 4:
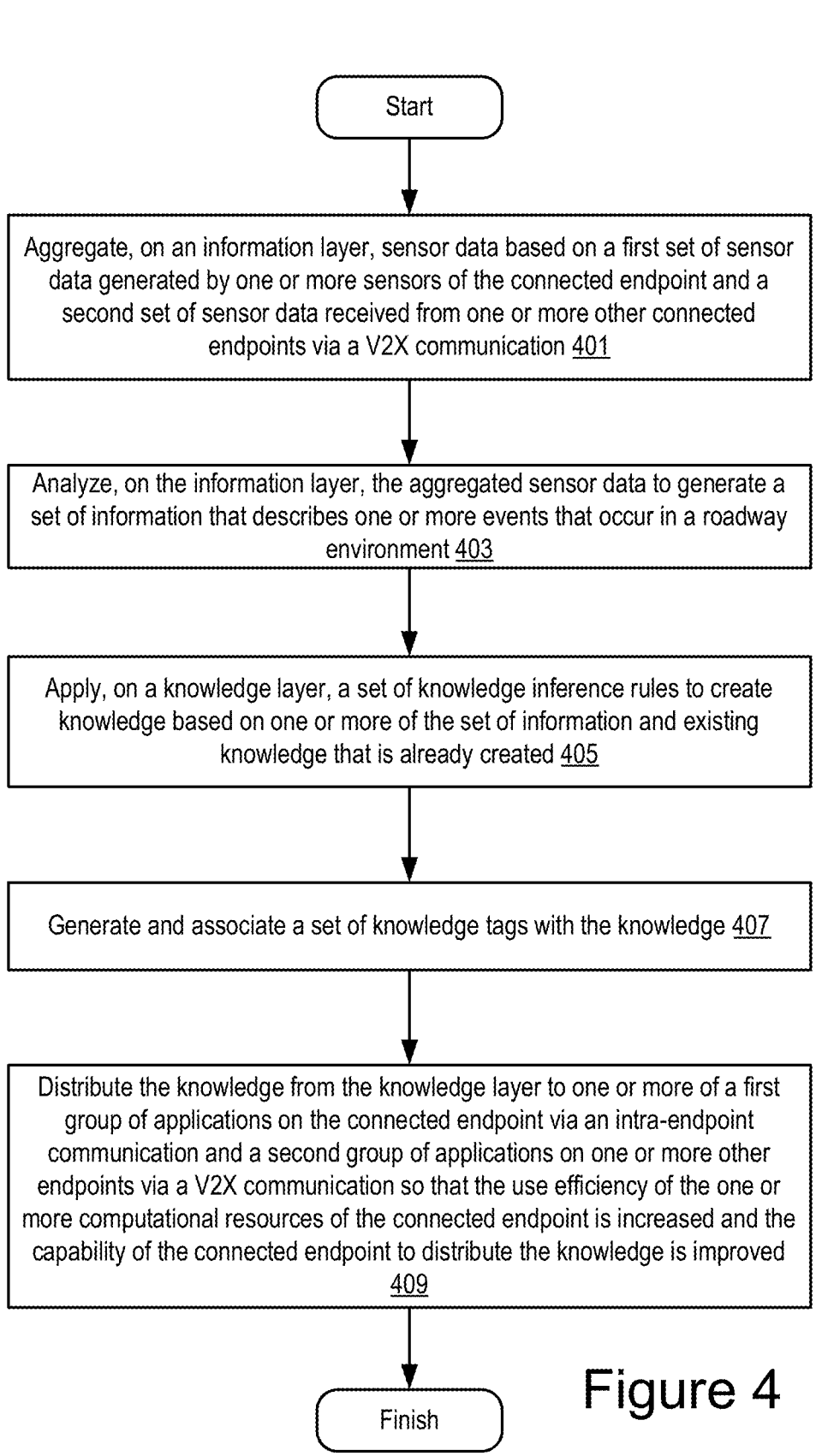
FIG. 4 depicts a method for generating and sharing knowledge according to some embodiments.

FIG. 4 depicts a method 400 for generating and sharing knowledge according to some embodiments. The steps of the method 400 are executable in any order, and not necessarily the order depicted in FIG. 4. The method 400 can be executed on a connected endpoint such as the ego vehicle 110.

At step 401, the information module 204 aggregates, on an information layer, sensor data based on a first set of sensor data generated by one or more sensors of the connected endpoint and a second set of sensor data received from one or more other connected endpoints via a V2X communication.

At step 403, the information module 204 analyzes, on the information layer, the aggregated sensor data to generate a set of information that describes one or more events that occur in a roadway environment.

At step 405, the knowledge creation module 196 applies, on a knowledge layer, a set of knowledge inference rules to create knowledge based on one or more of the following: (1) the set of information; and (2) existing knowledge that is already created.

At step 407, the knowledge creation module 196 generates and associates a set of knowledge tags with the knowledge.

At step 409, the knowledge distribution module 198 distributes the knowledge from the knowledge layer to one or more of a first group of applications on the connected endpoint via an intra-endpoint communication and a second group of applications on one or more other endpoints via a V2X communication so that the use efficiency of the one or more computational resources of the connected endpoint is increased and the capability of the connected endpoint to distribute the knowledge is improved. The intra-endpoint communication can include a communication channel for exchanging digital data within the connected endpoint.

Figure 5:
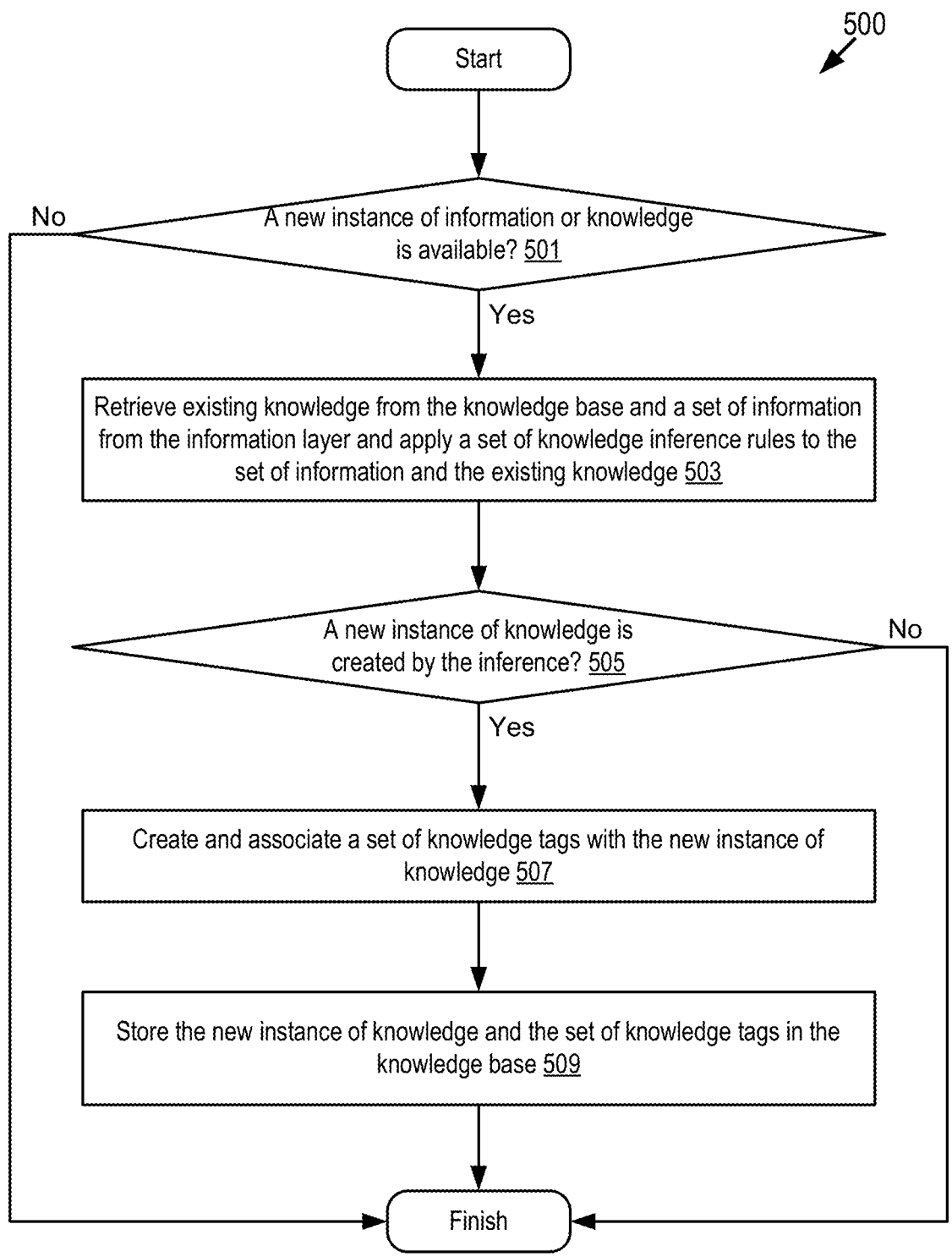
FIG. 5 depicts another method for generating knowledge according to some embodiments.

FIG. 5 depicts another method 500 for generating knowledge according to some embodiments. The steps of the method 500 are executable in any order, and not necessarily the order depicted in FIG. 5. The method 500 can be executed on a connected endpoint such as the ego vehicle 110.

At step 501, the knowledge creation module 196 determines whether a new instance of information or knowledge is available. Responsive to determining that a new instance of information or knowledge is available, the method 500 moves to step 503. Otherwise, the method 500 ends.

At step 503, the knowledge creation module 196 retrieves existing knowledge from the knowledge base 197 and a set of information from the information layer and applies a set of knowledge inference rules to the set of information and the existing knowledge.

At step 505, the knowledge creation module 196 determines whether a new instance of knowledge is created by the inference at step 503. Responsive to a new instance of knowledge being created by the inference, the method 500 moves to step 507. Otherwise, the method 500 ends.

At step 507, the knowledge creation module 196 creates and associates a set of knowledge tags with the new instance of knowledge.

At step 509, the knowledge creation module 196 stores the new instance of knowledge and the set of knowledge tags in the knowledge base 197.

Figure 6A:
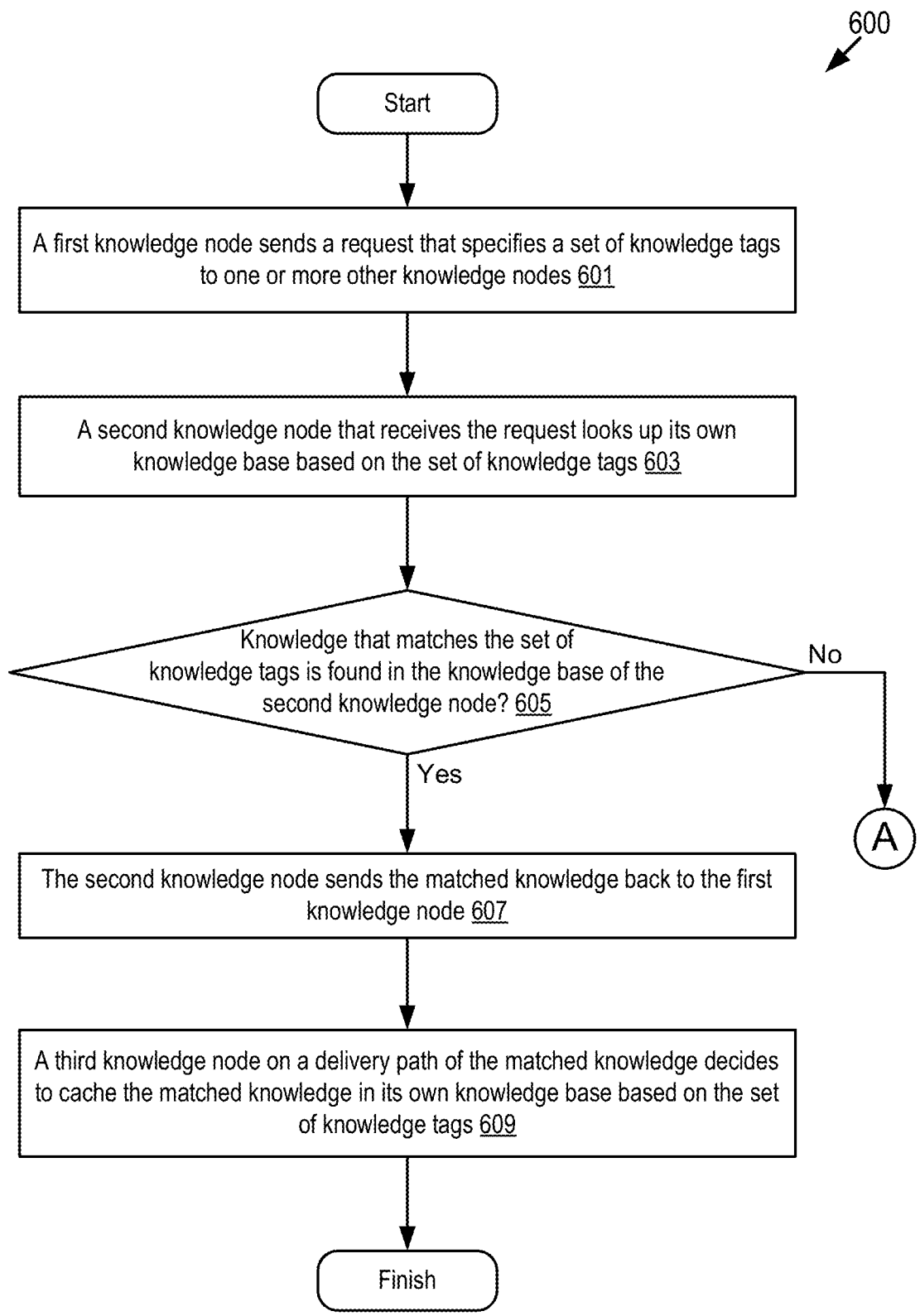
FIGS. 6A-6B depict a method for sharing knowledge according to some embodiments.
Figure 6B:
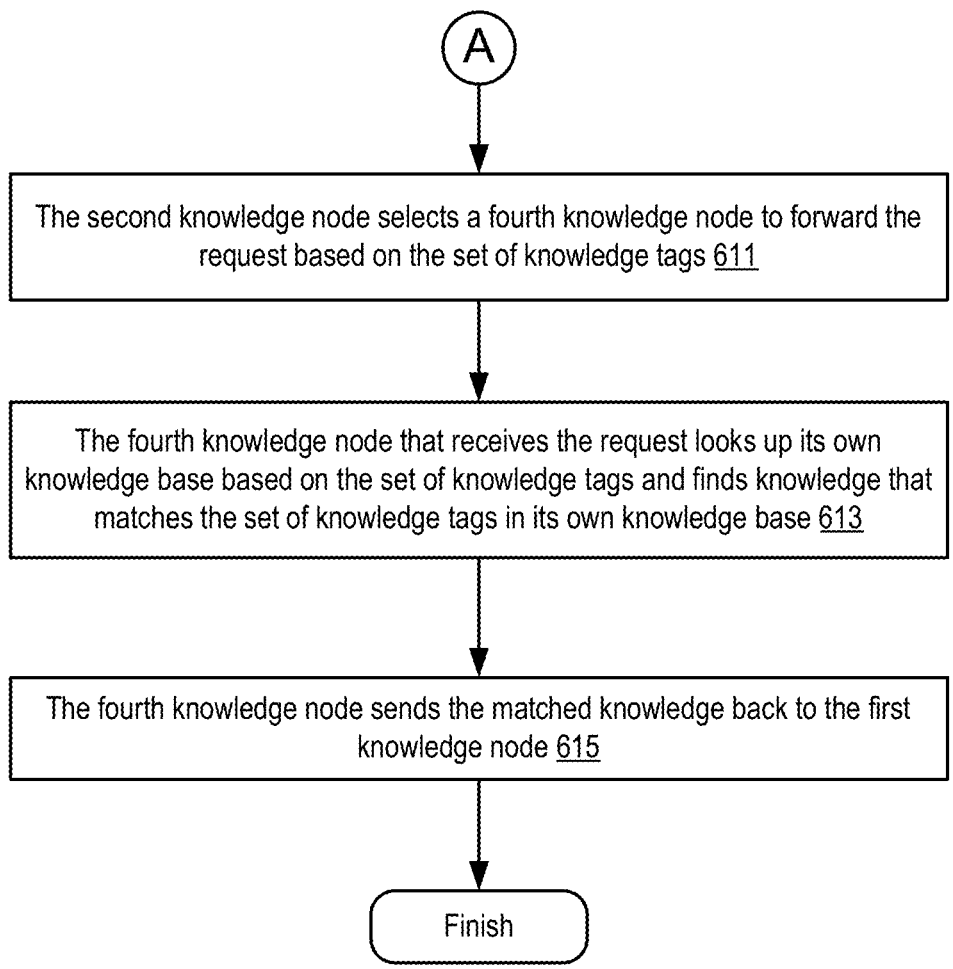

FIGS. 6A-6B depict a method 600 for sharing knowledge according to some embodiments. The steps of the method 600 are executable in any order, and not necessarily the order depicted in FIGS. 6A-6B.

Referring to FIG. 6A, at step 601, a first knowledge node (e.g., the knowledge distribution module 198 of the first knowledge node) sends a request that specifies a set of knowledge tags to one or more other knowledge nodes. This step may be referred to as a request operation.

At step 603, a second knowledge node (e.g., the knowledge distribution module 198 of the second knowledge node) that receives the request looks up its own knowledge base 197 based on the set of knowledge tags.

At step 605, the second knowledge node (e.g., the knowledge distribution module 198 of the second knowledge node) determines whether knowledge that matches the set of knowledge tags is found in the knowledge base 197 of the second knowledge node. Responsive to the knowledge that matches the set of knowledge tags being found in the knowledge base 197 of the second knowledge node, the method 600 moves to step 607. Otherwise, the method 600 moves to step 611.

At step 607, the second knowledge node sends the matched knowledge back to the first knowledge node. For example, the second knowledge node sends the matched knowledge back to the first knowledge node over vehicular networks (e.g., via a delivery path that is reverse to a path along which the request is delivered to the second knowledge node). Steps 603, 605 and 607 may be referred to as a responding operation.

At step 609, a third knowledge node on the delivery path of the matched knowledge (e.g., the knowledge distribution module 198 of the third knowledge node) decides to cache the matched knowledge in its own knowledge base 197 based on the set of knowledge tags associated with the matched knowledge. For example, a knowledge node that is close to a geographical region indicated by a location tag may cache the knowledge with a higher probability. This step may be referred to as a caching operation.

Referring to FIG. 6B, at step 611, the second knowledge node (e.g., the knowledge distribution module 198 of the second knowledge node) selects a fourth knowledge node to forward the request based on the set of knowledge tags. Steps 603, 605 and 611 may be referred to as a forwarding operation.

For example, the second knowledge node forwards the request on vehicular networks toward one or more other knowledge nodes that are more likely to have the requested knowledge. The one or more other knowledge nodes in the next "hop" are selected based on the set of knowledge tags. For example, the one or more other knowledge nodes are knowledge nodes that are close to a region of interest indicated by a location tag and are more likely to keep the requested knowledge in their own knowledge bases 197.

At step 613, the fourth knowledge node (e.g., the knowledge distribution module 198 of the fourth knowledge node) that receives the request looks up its own knowledge base based on the set of knowledge tags and finds knowledge that matches the set of knowledge tags in its own knowledge base 197. However, if the fourth knowledge node does not find knowledge that matches the set of knowledge tags in its own knowledge base 197, it may forward the request to another knowledge node.

At step 615, assume that the fourth knowledge node finds knowledge that matches the set of knowledge tags in its own knowledge base 197. The fourth knowledge node (e.g., the knowledge distribution module 198 of the fourth knowledge node) sends the matched knowledge back to the first knowledge node.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a connected endpoint, comprising:
    analyzing, on an information layer, sensor data to generate a set of information that describes one or more events that occur in a roadway environment; and
    generating, on a knowledge layer, knowledge by:
        applying a set of knowledge inference rules to (a) the set of information and (b) existing knowledge that is already created, wherein the set of knowledge inference rules use propositional logic;
        finding one or more patterns within the set of information and the existing knowledge; and
        associating the knowledge with a set of knowledge tags;
    wherein the knowledge increases a use efficiency of one or more computational resources of the connected endpoint and a capability of the connected endpoint to distribute the knowledge.

2. The method of claim 1, wherein the knowledge has a common format compatible with one or more of a first group of applications on the connected endpoint or a second group of applications on one or more other endpoints and the method further comprises:
    distributing the knowledge from the knowledge layer to the one or more of the first group of applications on the connected endpoint via an intra-endpoint communication or the second group of applications on the one or more other endpoints via a Vehicle-to-Everything (V2X) communication so that the use efficiency of the one or more computational resources of the connected endpoint is increased and the capability of the connected endpoint to distribute the knowledge is improved.

3. The method of claim 2, wherein distributing the knowledge from the knowledge layer to the second group of applications on the one or more other endpoints via the V2X communication comprises:
    modifying an operation of a communication unit of the connected endpoint to transmit a V2X message that includes the knowledge to the one or more other endpoints.

4. The method of claim 2, wherein the knowledge is distributed to the one or more of the first group of applications on the connected endpoint or the second group of applications on the one or more other endpoints based on the set of knowledge tags so that the capability of the connected endpoint to distribute the knowledge is further improved.

5. The method of claim 2, wherein the set of knowledge tags includes one or more of the following: a location tag; a time tag; a content tag; or a priority tag.

6. The method of claim 2, further comprising storing the knowledge in a knowledge base based on the set of knowledge tags.

7. The method of claim 1, further comprising
    receiving, from a first knowledge node, a request that specifies a set of knowledge tags to one or more other knowledge nodes;
    looking up, with a second knowledge node, a knowledge base based on the set of knowledge tags; and
    responsive to determining that the knowledge that matches the set of knowledge tags is found in the knowledge base of the second knowledge node, sending matched knowledge back to the first knowledge node.

8. The method of claim 1, wherein the one or more events describe one or more answers to one or more questions about the roadway environment.

9. The method of claim 1, wherein the knowledge includes digital bits that describe a fact or a belief that is extracted from analyzing the one or more patterns in the set of information.

10. The method of claim 1, further comprising:
    aggregating the sensor data on the information layer based on a first set of sensor data generated by one or more sensors of the connected endpoint and a second set of sensor data received from one or more other connected endpoints via a Vehicle-to-Everything (V2X) communication.

11. A system comprising:
an onboard computer system of a connected endpoint including a non-transitory memory storing computer code which, when executed by the onboard computer system, causes the onboard computer system to:
analyze, on an information layer, sensor data to generate a set of information that describes one or more events that occur in a roadway environment; and
generate, on a knowledge layer, knowledge by:
applying a set of knowledge inference rules to (a) the set of information and (b) existing knowledge that is already created, wherein the set of knowledge inference rules use propositional logic;
finding one or more patterns within the set of information and the existing knowledge; and
associating the knowledge with a set of knowledge tags;
wherein the knowledge increases a use efficiency of one or more computational resources of the connected endpoint and a capability of the connected endpoint to distribute the knowledge.

12. The system of claim 11, wherein the knowledge has a common format compatible with one or more of a first group of applications on the connected endpoint or a second group of applications on one or more other endpoints and wherein the computer code, when executed by the onboard computer system, causes the onboard computer system to:
distribute the knowledge from the knowledge layer to the one or more of the first group of applications on the connected endpoint via an intra-endpoint communication or the second group of applications on the one or more other endpoints via a Vehicle-to-Everything (V2X) communication so that the use efficiency of the one or more computational resources of the connected endpoint is increased and the capability of the connected endpoint to distribute the knowledge is improved.

13. The system of claim 12, wherein the computer code, when executed by the onboard computer system, causes the onboard computer system to distribute the knowledge from the knowledge layer to the second group of applications on the one or more other endpoints via the V2X communication at least by:
modifying an operation of a communication unit of the connected endpoint to transmit a V2X message that includes the knowledge to the one or more other endpoints.

14. The system of claim 12, wherein the computer code, when executed by the onboard computer system, causes the onboard computer system to:
receive, from a first knowledge node, a request that specifies a set of knowledge tags to one or more other knowledge nodes;
look up, with a second knowledge node, a knowledge base based on the set of knowledge tags; and
responsive to determining that the knowledge that matches the set of knowledge tags is found in the knowledge base of the second knowledge node, send matched knowledge back to the first knowledge node.

15. The system of claim 12, wherein the knowledge is distributed to the one or more of the first group of applications on the connected endpoint or the second group of applications on the one or more other endpoints based on the set of knowledge tags so that the capability of the connected endpoint to distribute the knowledge is further improved.

16. The system of claim 12, wherein the set of knowledge tags includes one or more of the following: a location tag; a time tag; a content tag; or a priority tag.

17. A computer program product comprising a non-transitory memory of an onboard computer system of a connected endpoint storing computer-executable code that, when executed by a processor, causes the processor to:
analyze, on an information layer, sensor data to generate a set of information that describes one or more events that occur in a roadway environment; and
generate, on a knowledge layer, knowledge by:
applying a set of knowledge inference rules to (a) the set of information and (b) existing knowledge that is already created, wherein the set of knowledge inference rules use propositional logic;
finding one or more patterns within the set of information and the existing knowledge; and
associating the knowledge with a set of knowledge tags;
wherein the knowledge increases a use efficiency of one or more computational resources of the connected endpoint and a capability of the connected endpoint to distribute the knowledge.

18. The computer program product of claim 17, wherein the knowledge has a common format compatible with one or more of a first group of applications on the connected endpoint or a second group of applications on one or more other endpoints and wherein the computer-executable code, when executed by the processor, causes the processor further to:
distribute the knowledge from the knowledge layer to the one or more of the first group of applications on the connected endpoint via an intra-endpoint communication or the second group of applications on the one or more other endpoints via a Vehicle-to-Everything (V2X) communication so that the use efficiency of the one or more computational resources of the connected endpoint is increased and the capability of the connected endpoint to distribute the knowledge is improved.

19. The computer program product of claim 18, wherein the computer-executable code, when executed by the processor, causes the processor to:
receive, from a first knowledge node, a request that specifies a set of knowledge tags to one or more other knowledge nodes;
look up, with a second knowledge node, a knowledge base based on the set of knowledge tags; and
responsive to determining that the knowledge that matches the set of knowledge tags is found in the knowledge base of the second knowledge node, send matched knowledge back to the first knowledge node.

20. The computer program product of claim 18, wherein the knowledge is distributed to the one or more of the first group of applications on the connected endpoint or the second group of applications on the one or more other endpoints based on the set of knowledge tags so that the capability of the connected endpoint to distribute the knowledge is further improved.

* * * * *